June 29, 1954  A. J. IMBLUM  2,682,399
SEMIELLIPTIC LEAF SPRING
Filed May 22, 1951
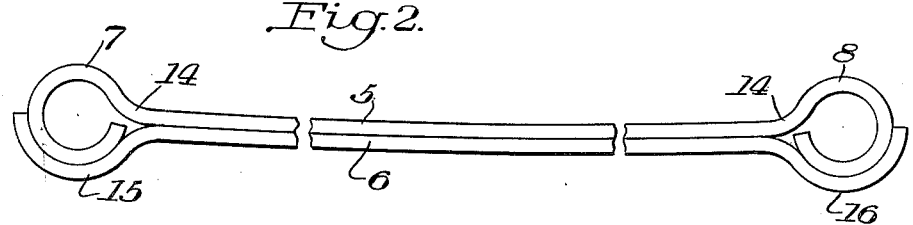
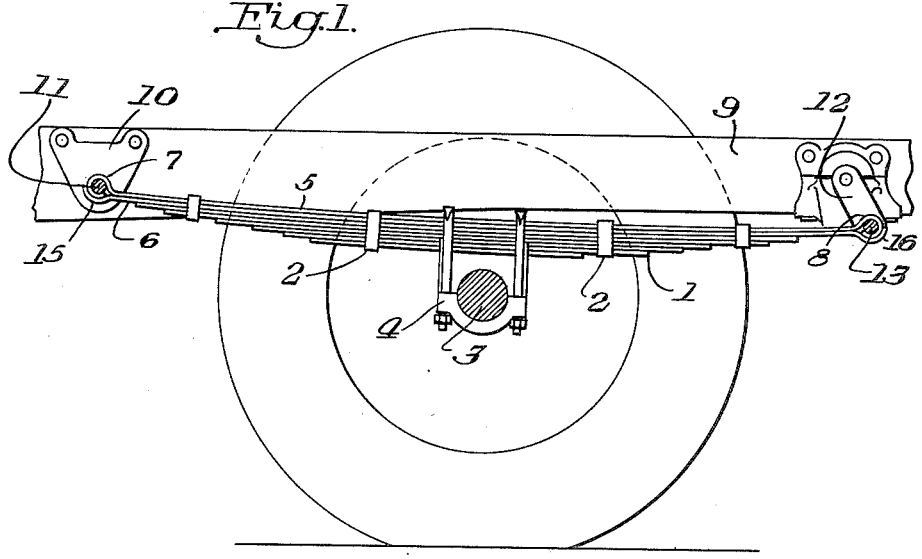
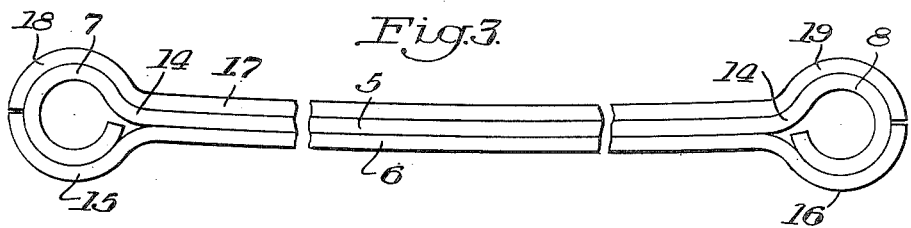
INVENTOR.
Allen J. Imblum
BY
ATTORNEY.

Patented June 29, 1954

2,682,399

UNITED STATES PATENT OFFICE 2,682,399

SEMIELLIPTIC LEAF SPRING

Allen J. Imblum, Pittsburgh, Pa.

Application May 22, 1951, Serial No. 227,723

1 Claim. (Cl. 267—47)

This invention relates to a semi-elliptic leaf spring generally of the type conventionally employed in the suspension of the frame and body of a motor vehicle. In modern practice the spring is fixed at an intermediate point to the vehicle axle, and one end is attached to the vehicle frame by a shiftable shackle while the other end of the spring has a fixed pivoted connection with the frame.

It is well known in the automotive field that the vehicle springs not only carry the load of the vehicle but also bear and absorb the strains and stresses of the brake and torque pressures especially since torque rods have been eliminated on all motor vehicle constructions. Due to the present permitted traveling speeds of motor vehicles, particularly of trucks and buses, and to the heavy loads carried by the latter, a very definite hazard is created when the brake is applied to the wheels of the vehicle, as the retarded wheels will naturally hold back on the highway and the load will surge forward and thereby place all of the stresses on the fixed eyes of the springs. The result is that the main leaves, of the conventional spring construction, have failed to satisfactorily withstand such strains and stresses normally attending the operation of the motor vehicle.

Important objects and advantages of the present invention are to provide a spring construction of the character described, which will take and absorb brake and torque stresses under any untoward conditions and thus eliminate, or at least minimize, failure or breakage of the spring structure, which will readily withstand the twists, strains and stresses placed on the fixed eye of the spring when the vehicle is rounding corners or when operating on rough roads, and which produces advantageous results by absorbing the stresses at the juncture of the main leaf with the fixed eye and by distributing said stresses to the center of the latter.

Further objects of the invention are to provide a spring of the class stated, which embodies novel means for reenforcing the main leaf and connecting eyes of the spring, which is simple in its construction and arrangement, durable and efficient in its use, compact, and comparatively economical in its manufacture, use, and maintenance.

In the accompanying drawing wherein is illustrated a practical embodiment of the principles of the invention, and wherein like numerals of reference designate corresponding parts throughout the several views:

Figure 1 is a side elevational view of a semi-elliptic spring and its mounting, and embodying a main leaf and reenforcing leaf constructed and arranged in accordance with the invention.

Figure 2 is an enlarged side elevational view showing the assembled relation of the main and reenforcing leaves.

Figure 3 is a similar view of a modified form of spring parts assembly embodying the present invention.

Referring in detail to the drawing I represents the entire semi-elliptic spring, which has its concave side facing upwardly, and is generally of the conventional shape. The spring is composed of a series of leaves fitting one against the other when compressed. The leaves vary in lengths and are secured together by a plurality of spaced clips 2 in the usual manner. The spring is shown secured intermediate of its ends to the vehicle axle 3 by a suitable clamping element 4.

The present invention resides in the construction and assembly arrangement of the main leaf 5 and of the adjacent reenforcing leaf 6 of the spring 1. The end portions of the main leaf are bent to form connecting eyes, respectively indicated at 7 and 8. One of the connecting eyes is bent to extend in the counter-clockwise direction, and the other of said connecting eyes is bent to extend in the clockwise direction.

One end of the spring 1 is attached to the vehicle frame 9 by a supporting bracket 10 which is fixed in position to the frame. A bolt 11 is engaged in the supporting bracket and extends through the connecting eye 7 in a manner whereby the latter is pivotally joined with the bolt 11 but is fixed relatively to its position with respect to the frame, and is commonly known as the fixed eye of the spring suspension.

The other end of the spring 1 is attached to the frame 1 by means of a shackle 12 which is supported by said frame. A bolt 13 is engaged in the shackle and extends through the connecting eye 8, whereby the latter has a pivotal and shiftable connection with the shackle structure.

In the operation of the motor vehicle the main leaves of the springs bear the entire duty of delivering the driving power from the axles to the vehicle frame and body, and the torque and thrust exerted on the fixed connecting eyes of the springs are greatly increased where no radius or torque rods are provided, and in consequence there is a tendency to open, fracture or break the fixed connecting eyes of the conventional type of springs. As stated, the aim of the present invention is to provide a practical spring structure for relieving the fixed connecting eyes of all torque and thrust stresses so that their fracture, breaking, or opening will be prevented.

To accomplish the above-mentioned results, the connecting eyes 7 and 8 are bent to form what is known in the art as a reverse eye, that is, the eyes are bent to coil in the reverse direction to the curvature of the main leaf. The eyes 7 and 8 are bent upwardly from their junctures 14 with the main leaf 5 and in a manner to dispose the upper part of the eye above the curvilinear alignment of the main leaf, and the lower part of the eye below the said curvilinear alignment of the main leaf, as clearly illustrated in Figure 2.

By such construction and arrangement of the reversed connecting eyes 7 and 8, all torque and brake stresses are distributed to the center of said eyes and are absorbed at the junctures 14 of the latter with the main leaf 5.

The main leaf 5, including the connecting eyes 7 and 8, is strengthened and protected by a reenforcing leaf 6, which is positioned directly beneath the main leaf in the spring assembly. The reenforcing leaf is fitted closely against the underside of the main leaf and extends throughout the length of the latter.

The end portions of the reenforcing leaf 6 are bent to form eye seats, respectively indicated at 15 and 16. The eye seats are substantially semicircular in contour, and have their concave sides facing upwardly in close fitting contact with the lower one-half part of respective connecting eyes 7 and 8, as clearly shown in Figure 2. Such engagement of the eye seats with respective connecting eyes underlaps the free ends of said connecting eyes and their junctures 14 with the main leaf 5, and will obviously reenforce the latter where most needed to readily withstand all stresses under any untoward conditions to which the main leaf may be subjected during the operation of the vehicle equipped therewith.

The modification of the invention, illustrated in Figure 3, differs from the disclosure herein before described only in that a rebound leaf 17 is embodied in the spring structure. The rebound leaf has its end portions bent reversely to form eye saddles, respectively indicated at 18 and 19. The eye saddles are substantially semi-circular in contour, and have their concave sides facing downwardly in close fitting contact with the upper one-half part of respective connecting eyes 7 and 8. The rebound leaf is fitted closely against top face of the main leaf 5 and extends throughout the length of the latter.

The embodiment and action of the rebound spring leaf 17 in the spring structure, in the manner described, gives added protection and strength to the main leaf 5 and to the connecting eyes 7 and 8, and further, mitigates the rebound force of the spring to thereby minimize the shock distributed through the vehicle due to rebound action of the spring.

It will here be noted that, to best meet conditions found in practice, the fixed connecting eye of the main leaves of the springs may be either disposed forwardly or rearwardly relatively to the forward direction of movement of the vehicle equipped therewith.

From the foregoing description taken in connection with the accompanying drawing, the construction and operation of the invention will be readily apparent to those skilled in the art to which the invention appertains, and while illustrating and describing what is known to be a practical embodiment of the invention, it is to be understood that changes in the form, proportions, and mechanical variations in the details of construction may be resorted to, without departing from the principle or sacrificing any advantages of the invention, which come within the scope of the claim hereunto appended.

What I claim is:

In an elliptical multi-leaf spring, in combination, a main leaf having its concave side facing upwardly, each end portion of said main leaf being reversely bent with respect to the curvature of said main leaf to form a connecting eye, a one-half portion of each of said connecting eyes being respectively disposed above and below the curvilinear extension of said main leaf, a reenforcing leaf positioned against the underside of said main leaf and extending throughout the length of the latter, each end portion of said reenforcing leaf being bent to form an eye seat engaging and closely fitting against the one-half lower portion of respective connecting eyes, a rebound leaf positioned against the top side of said main leaf and extending throughout the length of the latter, each end portion of said rebound leaf being bent to form an eye saddle engaging and closely fitting against the upper one-half portion of respective connecting eyes.

References Cited in the file of this patent

UNITED STATES PATENTS

| Number | Name | Date |
|---|---|---|
| 2,058,281 | Wesley | Oct. 20, 1936 |
| 2,510,418 | Roehrig | June 6, 1950 |

FOREIGN PATENTS

| Number | Country | Date |
|---|---|---|
| 234,500 | Great Britain | Oct. 15, 1925 |
| 335,750 | Great Britain | Oct. 2, 1930 |
| 423,118 | Great Britain | Jan. 25, 1935 |
| 469,393 | Great Britain | July 20, 1937 |